(12) United States Patent
Buist, Sr.

(10) Patent No.: US 10,758,319 B2
(45) Date of Patent: Sep. 1, 2020

(54) SURGICAL DENTAL TOOL

(71) Applicant: Charles Buist, DMD, PA, Hilton Head Island, SC (US)

(72) Inventor: Charles Buist, Sr., Columbia, SC (US)

(73) Assignee: Charles Buist, DMD, PA, Hilton Head Island, SC (US)

(*) Notice: Subject to any disclaimer, the term of this patent is extended or adjusted under 35 U.S.C. 154(b) by 258 days.

(21) Appl. No.: 15/860,799

(22) Filed: Jan. 3, 2018

(65) Prior Publication Data
US 2019/0201163 A1  Jul. 4, 2019

(51) Int. Cl.
| A61C 1/08 | (2006.01) |
| A61C 8/00 | (2006.01) |
| A61C 5/44 | (2017.01) |
| A61C 1/18 | (2006.01) |

(52) U.S. Cl.
CPC ............... *A61C 1/084* (2013.01); *A61C 5/44* (2017.02); *A61C 8/0089* (2013.01); *A61C 1/185* (2013.01)

(58) Field of Classification Search
CPC ..... A61C 8/0089; A61C 8/0092; A61C 1/084; A61C 1/185; A61C 5/44; A61C 3/10; A61C 3/12; A61C 3/02; A61C 15/00; A61C 15/02; A61C 15/048; A61B 17/3211–3217; A61B 2017/0046; A61B 2017/00477; A61B 2017/00473; A61B 17/3205; A61B 17/32053; A61B 17/3209; A61B 17/1604; A61B 17/1673; A61B 5/150442; A61B 5/15405; A61B 5/154058; A61B 5/150465; B26B 29/02; B26B 29/06

USPC .... 433/144, 51, 146, 147; 30/329, 339, 335; 606/170
See application file for complete search history.

(56) References Cited

U.S. PATENT DOCUMENTS 3,624,908 A * 12/1971 Ricketts .................. A61C 3/06
433/118
3,922,784 A * 12/1975 Prince ....................... B26B 5/00
30/317
(Continued)

FOREIGN PATENT DOCUMENTS

CN  203379191 U   1/2014
CN  203789985 U   8/2014
(Continued)

*Primary Examiner* — Sean M Michalski
*Assistant Examiner* — Shannel N Wright
(74) *Attorney, Agent, or Firm* — Burr & Forman LLP; Hunter S. Freeman (57) ABSTRACT

The present invention relates to a surgical dental tool for assisting with the implantation of a dental implant. The tool is designed to create an opening in a patient's jaw into which the dental implant will be inserted. In one embodiment, the tool includes a handle, a blade carrier, a pick and a blade stabilizing channel formed in at least a portion of the blade carrier and extends through at least a portion of the pick. The blade stabilizing channel receives and stabilizes a cutting blade. The blade carrier may include an adjustable clamping plate for removably securing the cutting blade in the blade stabilizing channel. The pick may include a sheath that receives and protects the tip of the cutting blade from breakage when the blade is in the blade stabilizing channel and is being used to cut a dental implant opening.

20 Claims, 4 Drawing Sheets

(56) References Cited

U.S. PATENT DOCUMENTS

| | | | | |
|---|---|---|---|---|
| 4,626,212 | A | * | 12/1986 | Mann .................... A61C 3/10 433/144 |
| 4,728,330 | A | | 3/1988 | Comparetto |
| 5,569,299 | A | * | 10/1996 | Dill ........................ A61B 10/06 600/564 |
| 6,485,495 | B1 | * | 11/2002 | Jenkinson .......... A61B 17/1604 606/167 |
| 6,685,472 | B2 | | 2/2004 | Kastenbaum |
| 7,303,396 | B2 | | 12/2007 | Abarno |
| 9,198,743 | B2 | | 12/2015 | Wang |
| 2012/0083816 | A1 | * | 4/2012 | Hajgato ............. A61B 17/3213 606/170 |
| 2012/0136379 | A1 | * | 5/2012 | Haddad ............... A61B 17/3211 606/167 |

FOREIGN PATENT DOCUMENTS

| | | |
|---|---|---|
| CN | 204744313 U | 11/2015 |
| DE | 102005016380 A1 | 10/2006 |
| EP | 1488745 A1 | 12/2004 |

\* cited by examiner

SURGICAL DENTAL TOOL

BACKGROUND OF THE INVENTION

1) Field of the Invention

The present invention relates to a surgical dental tool for assisting with the implantation of a dental implant. More specifically, the dental tool is designed to create an opening in a patient's jaw into which the dental implant will be inserted.

In at least one embodiment, the surgical dental tool includes a handle, a blade carrier, a pick and a blade stabilizing channel formed in the blade carrier and the pick. In use, the pick and blade may be used to cut an opening in a patient's jaw so that a dental implant may be inserted therein.

2) Description of Related Art

Traditionally, osteotomes are used to create an opening in a patient's jaw for insertion of a dental implant. Osteotomes typically have a first end that includes a handle and a second end that includes a pick or chisel. The picked or chiseled end is used to puncture a patient's jaw bone so that a dental implant can be inserted therein. Often times, a hammer or mallet is used to hit the handle so as to drive the picked or chiseled end of the osteotome into the patient's jaw bone with enough force to create the desired dental implant opening.

This use of blunt force to puncture a patient's jaw has two distinct disadvantages. First, the use of a pick of chisel to puncture a bone causes a good deal of trauma to the patient's bone, which in turn causes a great deal of pain to the patient and lengthens the patient's recovery time. Second, traditional osteotomes do not allow for the desired amount of precision with respect to the placement of the dental implant opening being created. However, due to the proximity of other teeth, nerves or other objects in the patient's jaw, it is often desirable to be able to place the opening with greater precision than is traditionally afforded by an osteotome.

While a traditional scalpel can be used to cut the soft tissue, traditional scalpels are not well suited for creating the type of implant opening that is formed by use of an osteotome. Traditional scalpels are not typically used to create such an opening because the blade typically extends outwardly from the scalpel and is not properly supported to allow the blade to undergo the forces typically needed to cut through bone. Accordingly, is very likely that the blade portion of a traditional scalpel would break and/or become lodged in the patient's jaw bone if used to cut the desired dental implant opening. While the blade of a traditional scalpel is removable, as would be necessary to replace blades that broke during use, removal of the blade is often difficult and can at times be dangerous in that the operator may be cut while attempting to remove the blade from the scalpel.

Accordingly, it is an object of the present invention to provide a dental tool that provides a blade capable of cutting an opening in a patient's jaw so that a dental implant may be implanted therein.

Another object of the present invention is to provide a dental tool that uses a cutting blade that is adequately supported by the dental tool so that the risk of the blade breaking or becoming lodged in the patient's jaw bone while cutting a dental implant opening is reduced.

Another object of the present invention is to provide a dental tool having a blade carrier for securing a cutting blade to the dental tool that allows the blade to be removed from the dental tool both easily and safely.

Another object of the present invention is to provide a dental tool that reduces the amount of trauma suffered by the patient's jaw bone as a result of creating a dental implant opening in the patient's jaw.

Another object of the present invention is to provide a dental tool that may more precisely place a dental implant opening in the patient's jaw thereby allowing more precise placement of a dental implant in the patient's jaw.

SUMMARY OF THE INVENTION

The above objectives are accomplished according to the present invention by providing a surgical dental tool comprising a handle; a blade carrier for securing a cutting blade, the blade carrier being carried by the handle; an elongated pick extending outwardly from the blade carrier and having a pointed tip adapted to puncture bone; and, a blade stabilizing channel disposed in the blade carrier and extending through at least a portion of the length of the pick, wherein the blade stabilizing channel is defined by a base and two opposing side walls and the blade stabilizing channel is adapted to receive a cutting blade such that the cutting blade extends from the blade carrier and along at least a portion of the pick.

In another embodiment the blade stabilizing channel extends through the entire length of the pick so that when the cutting blade is in the blade stabilizing channel, the blade extends to the tip of the pick. The dental tool may also include a sheath disposed at the tip of the pick so that the sheath is adjacent to the blade stabilizing channel, wherein the sheath receives a tip of the cutting blade when the cutting blade is in the blade stabilizing channel. In at least one embodiment, the sheath is formed by the tip of the pick.

In one embodiment, the height of the two opposing side walls of the channel at a point where the two opposing side walls are formed by the pick is less than the height of the two opposing side walls at a point where the two opposing side walls are formed by the blade carrier. In one embodiment, the height of the side walls of the blade stabilizing channel at a point adjacent to the tip of the pick that is less than the height of the side walls at a point on the pick that is adjacent to the blade carrier.

In one embodiment, the dental tool further comprises a spacer carried by the distal end of the handle and interconnecting the handle and the blade carrier, the spacer comprising: a first extension member having a first end that is carried by the distal end of the handle so that a second end of the first extension member extends from the distal end in a direction that is generally perpendicular to the handle; and, an opening formed adjacent to the second end that is adapted to removably carry the blade carrier in a generally parallel positional relationship to the handle.

In another embodiment, the surgical dental tool comprises: a handle having a proximal end and a distal end; a blade carrier located at the distal end of the handle and comprising: a substantially flat blade support wall that is formed in the blade carrier; a clamping plate that is adjustably carried by the blade support wall, wherein the clamping plate has an inner wall and an outer wall and is operable between an engaged position for securing a cutting blade to the blade carrier and a disengaged position for releasing the cutting blade from the blade carrier; a blade stabilizing channel formed in the blade carrier and defined by a base, the blade support wall and an opposing side wall, wherein at least a portion of the opposing side wall is defined by at least a portion of the inner wall of the clamping plate, the blade stabilizing channel being adapted to receive the cutting blade; a locking post disposed on the inner wall of the clamping plate; an opening defined in the blade support wall that is adapted to receive the locking post when the clamping plate is in the engaged position; a locking nut that is adapted to receive and secure the locking post when the clamping plate is in the engaged position, the locking nut being disposed in a slot that is formed in the blade carrier and is located adjacent to the opening in the blade support wall; and, whereby when the cutting blade is placed in the blade stabilizing channel and the clamping plate is placed in the engaged position, the locking post is inserted into the opening and received by the locking nut so that the locking nut engages the locking post to move the clamping plate towards the blade support wall, so that the cutting blade is maintained in the blade stabilizing channel by clamping the cutting blade between the clamping plate and the blade support wall.

In one embodiment, the locking nut is disposed in the slot such that at least a portion of the locking nut extends above an opening of the slot and past an exterior surface of the blade carrier.

In one embodiment, the inner wall of the clamping plate forms the entire surface of the first side wall of a portion of the blade stabilizing channel that is formed by the blade carrier. In one embodiment, the dental tool further includes a support post disposed on the inner wall of the clamping plate and a support opening defined in the blade supporting wall that is adapted to receive the support post when the clamping plate is placed the engaged position.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
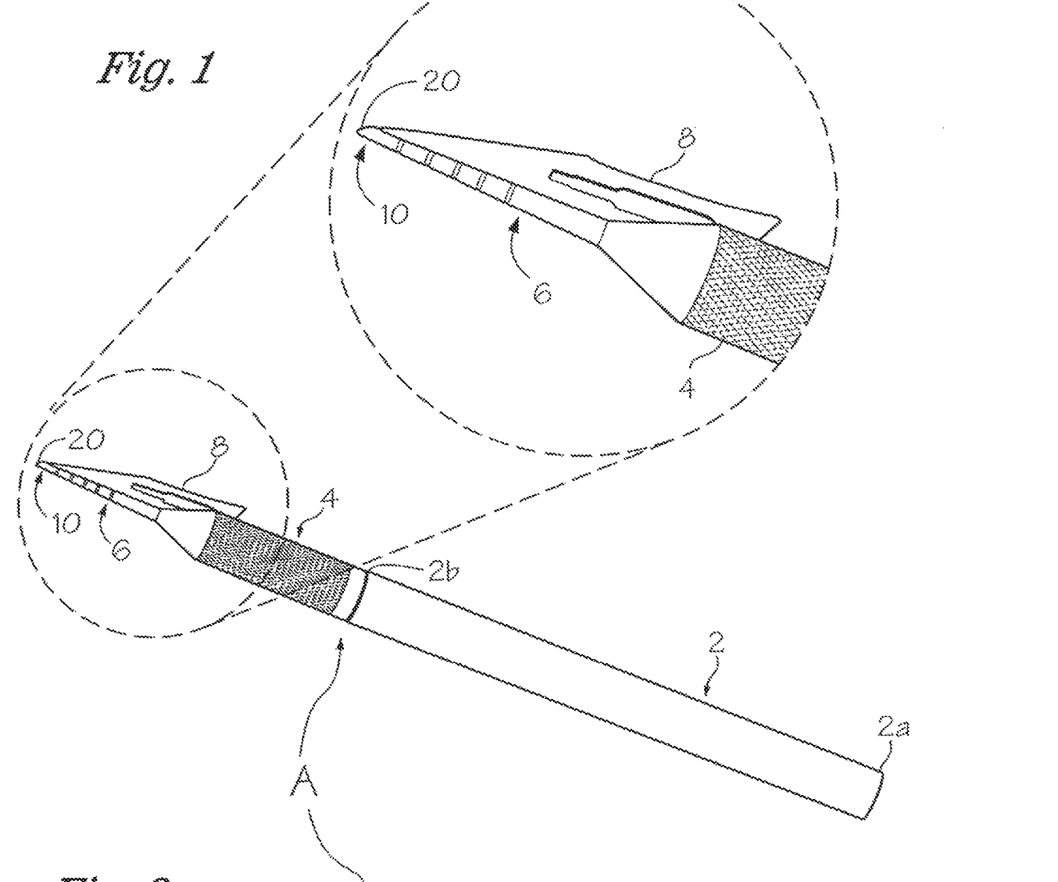
FIG. 1 shows a perspective view of an embodiment of the present invention with a blown up portion illustrating a portion of the present invention.
Figure 2:
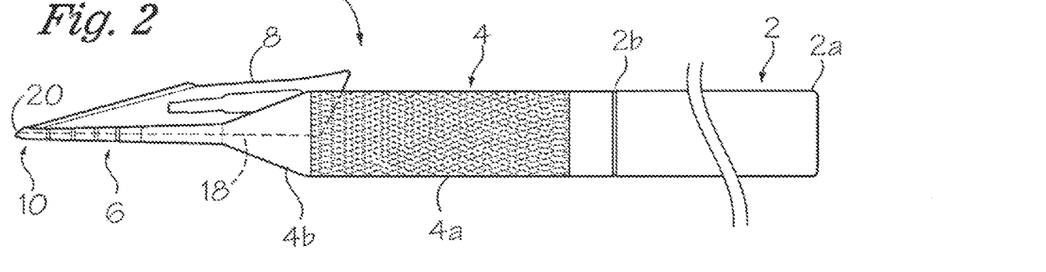
FIG. 2 shows a side elevation view of and embodiment of the present invention.
Figure 3:
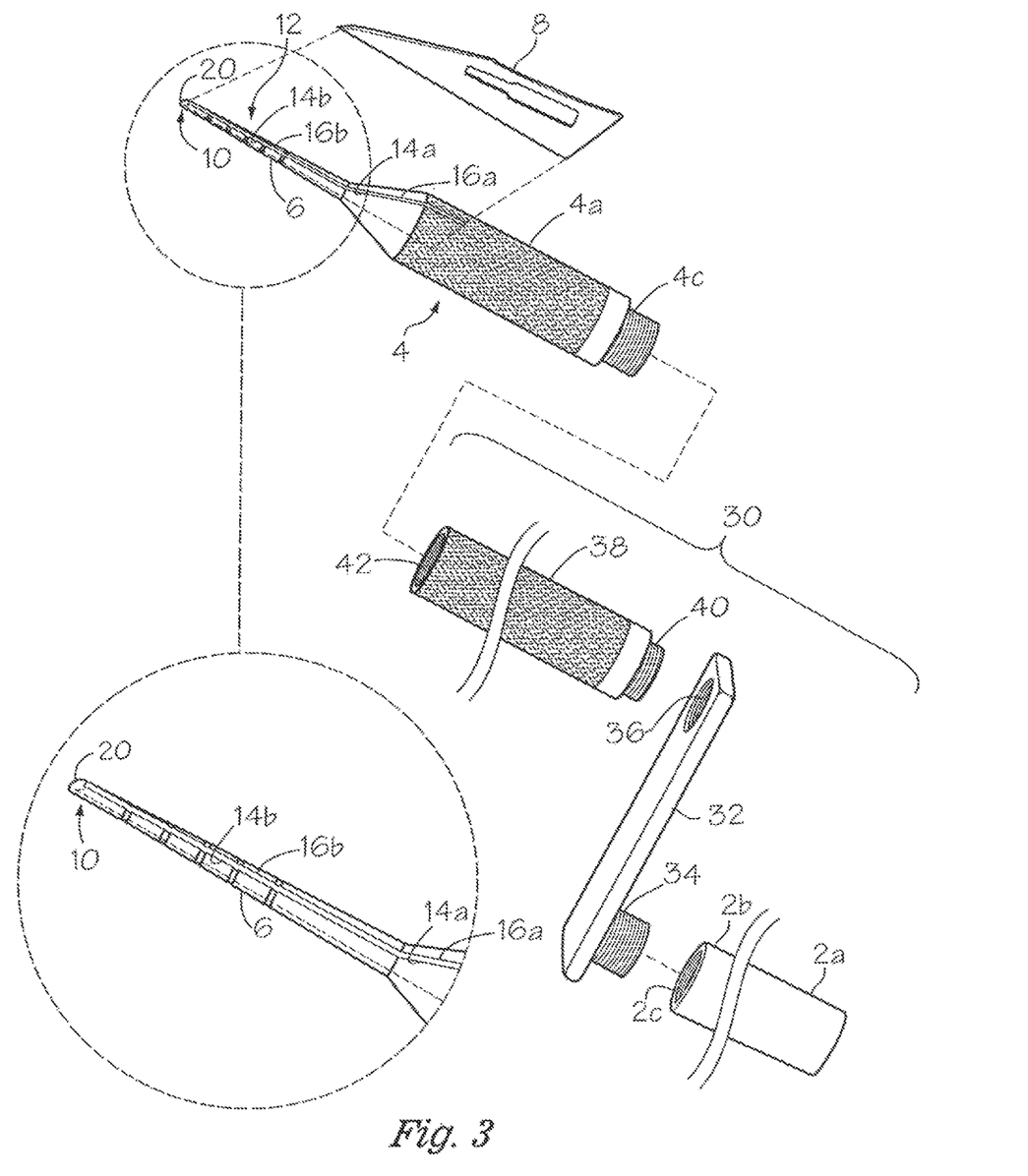
FIG. 3 show an exploded view of an embodiment of the present invention.

Referring now to FIGS. 1-3 a first embodiment of the present invention is generally shown as A. The surgical dental tool includes a handle 2, a blade carrier 4 and a pick 6. The present invention further includes a blade stabilizing channel 12 that is formed in and extends along at least a portion of the blade carrier 4 and pick 6. The channel 12 is adapted to receive and secure a cutting blade 8. As will be described in more detail below, the surgical tool is used to create an opening in a patient's jaw so that a dental implant may be inserted into the opening. Generally speaking, the dental implant opening is created when the pick 6 is forced into a patient's jaw bone. As the pick 6 enters the patient's bone, the cutting blade 8 can then cut an opening for a dental implant, also known as a dental implant opening. By securing a blade 8 in the blade stabilizing channel 12, the surgical dental tool can be used to cut a dental implant opening rather than puncturing such an opening. The result is that a dental implant opening that has been cut has cleaner straighter edges that are likely to heal more quickly and less painfully than the edges of the opening that has been punctured. Moreover a dental opening that has been cut can be placed with more precision than one that is punctured.

In the shown embodiment, the elongated handle 2 has a proximal end 2a that may be grasped by the user and a distal end 2b which is connected to the blade carrier 4. While the shown embodiment includes a handle having a generally cylindrical shape, any other shape suitable for grasping the tool may be used. As will be described in more detail below, the blade carrier 4 is adapted to receive a cutting blade 8 and secure the cutting blade to the tool. In the shown embodiment, the blade carrier 4 includes a first cylindrical portion 4a that has the same general shape as the handle 2 so that the blade carrier 4 generally extends or lengthens the handle 2. In alternate embodiments, however, the first portion 4a of the blade carrier 4 may have a shape that is different from the handle. This would especially be true when the handle 2 has an ergonomical shape designed to aid in the gripping of the handle. The blade carrier 4 also includes a tapered or frustroconical section 4b. In alternate embodiments, the blade carrier 4 may only have one section such that the entire blade carrier could have one of a number of shapes such as a conical, frustroconical, cylindrical or square.

In the shown embodiment, a pick 6 extends from the tapered section 4b of the blade carrier 4. The pick 6 generally serves as the first point of contact between the tool and the patient's jaw and assists with creating the dental implant opening. In the shown embodiment, pick 6 has a generally conical shape which tapers to a pointed tip 10. The tip 10 is designed to puncture a patient's jaw bone when a sufficient downward force is applied to the handle 2. As can be seen in FIG. 3, a blade stabilizing channel 12 is formed in at least a portion of the blade carrier 4 and extends through at least a portion of the pick 6. The blade stabilizing channel is adapted to receive and support the cutting blade 8 and is defined by a first side wall 14, a second opposing side wall 16 and a base 18 interconnecting the two side walls. In one embodiment, such as the one shown in FIGS. 1-3, the first and second side wall 14 and 16 extend continuously along the length of the entire blade stabilizing channel 12. In another embodiment, such as the one shown in FIGS. 4-6, one or both of the side walls may be defined by two or more separate walls (for example 14 and 15) that together extend the entire length of the blade stabilizing channel 12. In the shown embodiment, the depth of the channel 12 varies as the height of the side walls 14a and 16a at a point where they are formed by the blade carrier 4 is greater than the height of the side walls 14b and 16b at a point where they are formed by the pick 6. When the blade 8 is inserted in the channel 12, the base 18 and side walls 14 and 16 of the channel 12 support the blade 8 and prevent it from shifting or wobbling during use. The greater height of the side walls 14a and 16a formed by the blade carrier 4 help provide additional stability to the cutting blade 8 when in use. In one embodiment, the blade 8 is secured in the blade stabilizing channel 12 by means of an adhesive. In such an embodiment, the adhesive may be applied at one or more points along the channel's base 18 and/or side walls 14 and 16. In alternate embodiments, however, the blade 8 is secured in the blade stabilizing channel 12 by means of friction whereby the width of the channel 12 is such that blade 8 is squeezed between the blade stabilizing channel's side walls 14 and 16. In yet other embodiments, the blade could be permanently disposed in the blade stabilizing channel 12 by means of welding or any other means generally known.

In the shown embodiment, the blade stabilizing channel 12 extends from the blade carrier 4 to the tip 10 of the pick 6 and into a sheath 20 that is formed in the tip 10 of the pick 6. As can be seen in FIG. 2, the sheath 20 is adapted to receive the tip of the cutting blade 8 when the cutting blade is placed in the channel 12. The sheath 20 protects the blade and prevents it from breaking or otherwise becoming lodged in the patient's jaw during use by ensuring that the tip 10 of the pick is the first point of contact with the patient's jaw. In the shown embodiment, the sheath 20 is formed by the tip 10 of the pick 6. In alternate embodiments, however, the sheath 20 could be connected to or formed around the tip 10 of the pick such that the sheath 20 could be removable.

In alternate embodiments, however, the channel 12 could extend through the tip 10 of the pick 6 such that there was no sheath formed by or included on the tip 10 of the pick 6. In such embodiments, however, it is desirable for the channel 12 to extend far enough into the blade carrier 4 such that the blade 8, when placed in the channel 12, would not extend past the tip 10 of the pick. If the blade 8 were allowed to extend past the tip 10 of the pick, the likelihood that the blade would break or become lodged in the patient's jaw during use would be increased.

In one embodiment, the blade carrier 4 is removably connected to the handle by means of a threaded connection post 4c that is adapted to be received by a threaded opening 2c that is defined in the distal end 2b of the handle. Thus, the blade carrier 4 may be removably attached to the handle 2 simply by screwing the blade carrier's connection post 4c into the opening 2c defined in the handle. In another embodiment, however, the surgical tool includes a spacer generally shown as 30. This spacer allows the blade carrier 4, pick 6 and blade 8 to be offset from the handle 2. Such an alignment becomes advantageous when using the surgical tool to cut a dental implant opening located in the back of the patient's jaw.

In one embodiment, the spacer 30 includes a first extension member 32 that is removably carried by the handle and includes first end having a threaded connection post 34 that is adapted to be received by a threaded opening 2c defined in the distal end 2b of the handle 2. The first extension member 32 also includes a threaded opening 36 defined in the end opposite of the first extension member 34. When connected to the distal end 2b of the handle by means of the threaded connection post 34, the first extension member 32 extends from the distal end 2b in a direction that is generally perpendicular to the handle 2 so that the opening 36 defined in the extension member 32 is laterally spaced from the handle 2. In the shown embodiment, the spacer 30 further includes a second extension member 38 having a first end that includes another threaded connection posted 40 that is adapted to be received by the threaded opening 36 defined in the first extension member. The second end of the second extension member 38 defines a threaded opening 42 that is adapted to receive the threaded connection post 4c included in the blade carrier 4. In alternate embodiments, however, there would be no need for the second extension member 38 and the blade carrier's threaded connection post 4c may be screwed into or otherwise received by the opening 36 defined in the first extension member 32.

Figure 4:
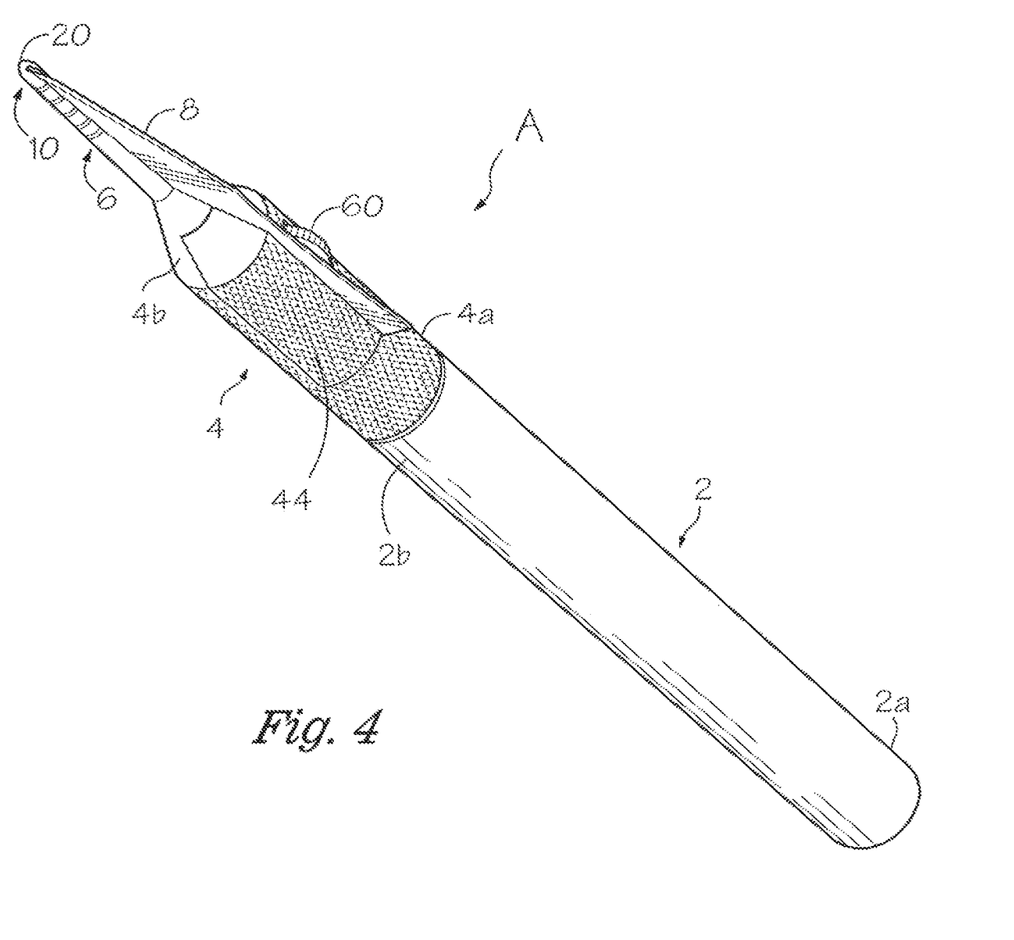
FIG. 4 shows a perspective view of an embodiment of the present invention.
Figures 5, 6:
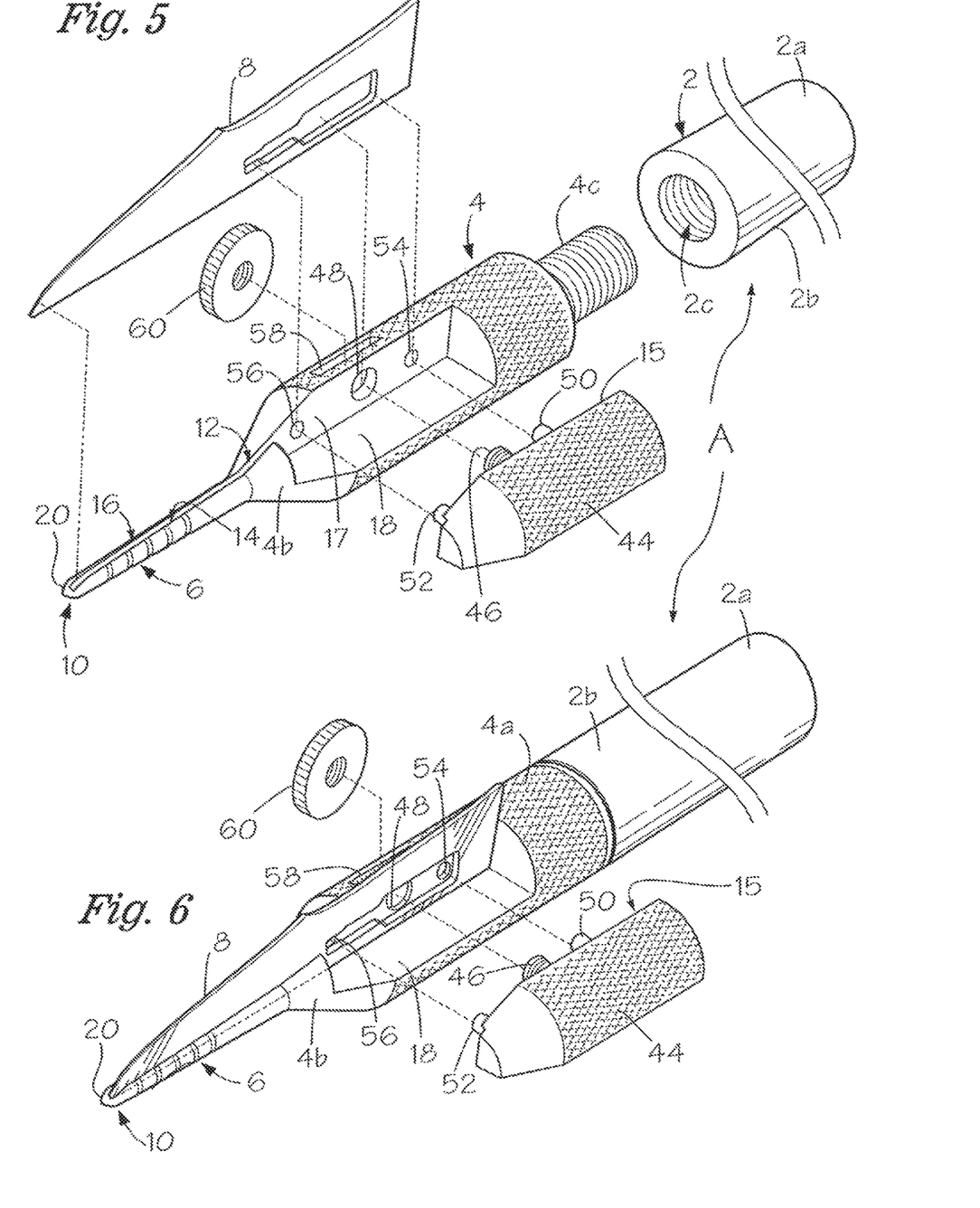
FIG. 5 shows an exploded view of an embodiment of the present invention.
FIG. 6 shows an exploded view of an embodiment of the present invention.

Referring now to FIGS. 4-6, another embodiment of the invention is illustrated. In this embodiment, the surgical tool, which is generally shown as A, has many of the same components as the embodiment shown in FIGS. 1-3. This embodiment includes a handle 2 having a proximal end 2a and a distal end 2*b*, wherein the distal end 2*b* has a threaded opening 2*c* defined therein. The threaded opening 2*c* is adapted to receive the threaded post 4*c* disposed on the blade carrier 4. Much like the embodiment shown in FIGS. 1-3, the blade carrier 4 includes a first portion 4*a* that is generally cylindrical and a second portion 4*b* which has a tapered or frustroconical shape. The pick 6 extends from the second tapered section 4*b* of the blade carrier. In this embodiment, the blade stabilizing channel 12 extends from the tip 10 of the pick 6 and through at least a portion of the blade carrier 4.

In the embodiment shown in FIGS. 4-6, the blade carrier 4 includes a clamping plate 44 that is removably, slideably or adjustably connected to the blade carrier 4. The blade carrier 4 includes a blade support wall 17 that is substantially flat and the clamping plate 44 includes an inner surface 15 that is substantially flat. In this embodiment, the blade support wall 17 and the clamping plate's inner wall 15 form at least a portion of the two side walls 14 and 16 of the blade stabilizing channel 12. In the shown embodiment, the clamping plate includes a locking post 46, which in the shown embodiment, is threaded and adapted to be received by a first opening 48 that is defined in the blade support wall 17 that is defined in the blade carrier 4. The inner wall 15 of the clamping plate 44 further includes two support posts 50 and 52 that are spaced from the locking post 46. These support posts 50 and 52 are adapted to be received by corresponding openings 54 and 56 defined in the blade support wall 17. The clamping plate 44 has an engaged position for securing the cutting blade 8 in the blade stabilizing channel 12 and a disengaged position for releasing the blade 8 for allowing the blade to be removed from the blade stabilizing channel 12. When placed in the engaged position, the inner wall 15 of clamping plate 44 is placed in contact with or adjacent to the blade support wall 17 and the locking post 46 and two support posts 50 and 52 are received by the openings 48, 54 and 56.

In this embodiment, the blade carrier 4 further includes a slot 58 that is defined in the exterior surface of the blade carrier 4 so that the slot is located behind the blade support wall 17 and extends into the blade carrier 4 such that the locking post opening 48 extends into the slot 58. The blade carrier 4 further includes a locking nut 60 that is disposed in the slot 58 so that the locking post 46 passes through the corresponding opening 48 in the blade support wall 17 and the locking nut 60 engages the locking post 46 so as to force the clamping plate's inner surface 15 towards the blade support wall 17 so as to place the clamping plate in the engaged position so that the blade 8 can be maintained in the blade stabilizing channel 12. In this embodiment, the blade support wall 17 and the clamping plate's inner surface 15 create a portion of the blade stabilizing channel's first and second side walls 14 and 16.

In the shown embodiment, the clamping plate may be switched back and forth from the engaged position and the disengaged position by varying the distance between the blade support wall 17 and the clamping plate's inner surface 15 through the use of the locking nut 60. In at least one embodiment, the locking nut 60 is threaded and corresponds to the threads disposed on the locking post 46 so that turning the locking nut 60 in one direction will force the clamping plate's inner surface 15 closer to the blade support wall 17, thus placing the clamping plate 44 in the engaged position, while turning the locking nut 60 in the opposite direction will force the clamping plate's inner surface 15 farther away from the blade support wall 17, thus placing the clamping plate in the disengaged position. In the shown embodiment, the locking nut 60 is disposed in the slot 58 such that at least a portion of the locking nut extends past the opening of the slot 58 and above the exterior surface of the blade carrier 4 so that the locking nut may be easily accessed and turned by the user. This allows the user to easily switch the clamping plate 44 between the engaged position and the disengaged position by using one hand or even one finger and, thus, eliminating the need for any tools to secure or remove a cutting blade to the tool. Moreover, the use of the locking nut 60 that protrudes from the slot 58 allows the blade to be removed without the need for the user to contact the blade during removal and, thus, reducing the possibility of being cut by the blade.

When the clamping plate 44 is in the engaged position, the two support posts 50 and 52 are received by the two corresponding openings 54 and 56 to reduce or prevent the clamping plate 44 and/or the blade 8 from rotating or shifting when the blade 8 is in the blade stabilizing channel 12. However, the use of a blade stabilizing channel 12 having a length that is approximately the same length as the blade and a base 18 that contacts the back of the blade 8 will also help reduce the possibility that the blade rotates or shifts within the blade stabilizing channel 12 during use.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A surgical dental tool comprising:
   a handle;
   a blade carrier for securing a cutting blade, said blade carrier being carried by said handle;
   an elongated pick extending outwardly from said blade carrier and having a tip that tapers so that said tip is pointed and extends in a direction that is parallel to a longitudinal axis of said handle; and,
   a blade stabilizing channel disposed in said blade carrier and extending through at least a portion of the length of said pick, wherein said blade stabilizing channel is defined by a base and two opposing side walls and said blade stabilizing channel is adapted to receive the cutting blade such that the cutting blade extends from said blade carrier and along at least a portion of said pick.

2. The dental tool of claim 1 wherein said blade stabilizing channel extends through the entire length of said pick so that when the cutting blade is in said blade stabilizing channel, the blade extends to said tip of said pick.

3. The dental tool of claim 1 wherein said pick includes a sheath disposed at said tip of said pick so that said sheath is adjacent to said blade stabilizing channel, wherein said sheath receives a tip of the cutting blade when the cutting blade is in said blade stabilizing channel.

4. The dental tool of claim 3 wherein said sheath is formed by said tip of said pick.

5. The dental tool of claim 1 wherein the height of said two opposing side walls of said channel at a point where said two opposing side walls are formed by said pick is less than the height of said two opposing side walls at a point where said two opposing side walls are formed by said blade carrier.

6. The dental tool of claim 1 further comprising a spacer carried by said distal end of said handle and interconnecting said handle and said blade carrier, said spacer comprising:
a first extension member having a first end that is carried by said distal end of said handle so that a second end of said first extension member extends from said distal end in a direction that is generally perpendicular to said handle; and,
an opening formed adjacent to said second end that is adapted to removably carry said blade carrier in a generally parallel positional relationship to said handle.

7. The dental device of claim 1 wherein the height of said side walls of said blade stabilizing channel at a point adjacent to said tip of said pick is less than the height of said side walls at a point that is adjacent to said blade carrier.

8. A surgical dental tool comprising:
a handle having a distal end and a proximal end;
a blade carrier carried by said distal end of said handle, said blade carrier including a clamping plate that is operable between an engaged position for securing a cutting blade to said blade carrier and a disengaged position for releasing the cutting blade from said blade carrier, said blade carrier further including a pick carried by said blade carrier such that said pick and said blade carrier extend along the same longitudinal axis, wherein said pick tapers to a pointed tip;
a blade stabilizing channel formed in said blade carrier that extends along at least a portion of said pick, said channel being defined by a base, a first side wall and a second side wall, wherein said channel is adapted to receive the cutting blade;
said clamping plate forms at least a portion of said first side wall of said blade stabilizing channel and is adapted to clamp the cutting blade between said clamping plate and said second side wall of said channel when said clamping plate is in said engaged position; and
a fastener disposed on said blade carrier that is adapted to receive at least a portion of said clamping plate and to force said clamping plate towards said second side wall of said channel so that said clamping plate is placed in said engaged position so that the cutting blade is clamped between said clamping plate and said second side wall of said channel.

9. The dental tool of claim 8 wherein said blade stabilizing channel extends from said blade carrier to said tip of said pick so that a tip of the cutting blade disposed in said channel will be adjacent to said tip of said pick.

10. The dental tool of claim 8 wherein said pick includes a sheath disposed adjacent to said tip of said pick so that said blade stabilizing channel extends into said sheath and said sheath receives a tip of the cutting blade when the cutting blade is in said blade stabilizing channel.

11. The dental tool of claim 8 wherein the height of said first and said second side walls of said blade stabilizing channel at a point where said first and said second side walls are formed by said pick is less than the height of said first and said second side walls at a point where said first side wall is formed by said clamping plate.

12. The dental tool of claim 8 further comprising:
a locking post disposed on said clamping plate;
a first opening adapted to receive said locking post and is defined in said second wall of said blade stabilizing channel;
a slot that is adapted to receive at least a portion of said fastener and is defined in said blade carrier at a point that is adjacent to said first opening so that said slot and said first opening are in fluid communication; and
wherein at least a portion of said fastener is disposed in said slot so that when said clamping plate is in said engaged position, said locking post traverses said blade stabilizing channel and is inserted into said first opening and said fastener engages said locking post to adjust the distance between said clamping plate and said second side wall of said channel.

13. The dental tool of claim 12 further including a second support post disposed on said clamping plate and said locking mechanism further includes a second opening adapted to receive said second support post and is defined in said second wall of said channel so that when said clamping plate is in said engaged position, said second support post traverses said channel and is inserted into said second opening.

14. The dental tool of claim 8 further comprising a spacer carried by said distal end of said handle and interconnecting said handle and said blade carrier, said spacer comprising:
a first extension member having a first end that is carried by said distal end of said handle so that a second end of said first extension member extends from said distal end in a direction that is generally perpendicular to said handle; and,
an opening formed adjacent to said second end that is adapted to removably carry said blade carrier in a generally parallel positional relationship to said handle.

15. The dental tool of claim 14 wherein said spacer further includes a second extension member that is carried by said second end of said first extension member so that said second extension member extends from said first extension member in a direction that is generally parallel to said handle, wherein said extension member is adapted to carry said blade carrier in a generally parallel positional relationship to said handle.

16. A surgical dental tool comprising:
a handle having a proximal end and a distal end;
a blade carrier located at said distal end of said handle and comprising:
a substantially flat blade support wall that is formed in said blade carrier;
a clamping plate that is adjustably carried by said blade support wall, wherein said clamping plate has an inner wall and an outer wall and is operable between an engaged position for securing a cutting blade to said blade carrier and a disengaged position for releasing the cutting blade from said blade carrier;
a blade stabilizing channel formed in said blade carrier and defined by a base, said blade support wall and an opposing side wall, wherein at least a portion of said opposing side wall is defined by at least a portion of said inner wall of said clamping plate, said blade stabilizing channel being adapted to receive the cutting blade;
a locking post disposed on said inner wall of said clamping plate;
an opening defined in said blade support wall that is adapted to receive said locking post when said clamping plate is in said engaged position;
a locking nut that is adapted to receive and secure said locking post when said clamping plate is in said engaged position, said locking nut being disposed in a slot that is formed in said blade carrier and is located adjacent to said opening in said blade support wall; and, whereby when the cutting blade is placed in said blade stabilizing channel and said clamping plate is placed in said engaged position, said locking post is inserted into said opening and received by said locking nut so that said locking nut engages said locking post to move said clamping plate towards said blade support wall, so that the cutting blade is maintained in said blade stabilizing channel by clamping the cutting blade between said clamping plate and said blade support wall.

17. The dental tool of claim 16 wherein said locking nut is disposed in said slot such that at least a portion of said locking nut extends above an opening of said slot and past an exterior surface of said blade carrier.

18. The dental device of claim 16 wherein said inner wall of said clamping plate forms the entire surface of said first side wall of said blade stabilizing channel that is formed by said blade carrier.

19. The dental tool of claim 16 further including a support post disposed on said inner wall of said clamping plate and a support opening defined in said blade supporting wall that is adapted to receive said support post when said clamping plate is placed said engaged position.

20. The dental tool of claim 16 further including a spacer carried by said distal end of said handle and interconnecting said handle and said blade carrier, said spacer comprising:
   a first extension member having a first end that is carried by said distal end of said handle so that a second end of said first extension member extends from said distal end in a direction that is generally perpendicular to said handle; and,
   a second extension member that is carried by said second end of said first extension member so that said second extension member extends from said first extension member in a direction that is generally parallel to said handle, wherein said second extension member is adapted to carry said blade carrier in a generally parallel positional relationship to said handle.

\* \* \* \* \*